United States Patent [19]

Oken et al.

[11] Patent Number: 5,036,538
[45] Date of Patent: Jul. 30, 1991

[54] MULTI-STATION VOICE RECOGNITION AND PROCESSING SYSTEM

[75] Inventors: Stanley Oken, Melville; Rao Vemula, South Huntington; Eugene Lee, Huntington Station, all of N.Y.

[73] Assignee: Telephonics Corporation, Huntington, N.Y.

[21] Appl. No.: 440,518

[22] Filed: Nov. 22, 1989

[51] Int. Cl.⁵ ............................................. G10L 7/08
[52] U.S. Cl. ...................................................... 381/43
[58] Field of Search ....................... 381/41–46, 381/110, 51–53; 364/513.5

[56] References Cited

U.S. PATENT DOCUMENTS

| | | | |
|---|---|---|---|
| 4,462,080 | 7/1984 | Johnstone et al. | 364/513.5 |
| 4,641,342 | 2/1987 | Watanabe et al. | 381/46 |
| 4,922,538 | 5/1990 | Tchorzewski | 381/43 |

OTHER PUBLICATIONS

Boll, "Suppression of Acoustic Noise in Speech Using Spectral Subtraction", IEEE Trans ASSP., vol. ASSP 37, No. 3, 4/79, pp. 113–120.

Primary Examiner—Gary V. Harkcom
Assistant Examiner—John A. Merecki
Attorney, Agent, or Firm—Schweitzer, Cornman & Gross

[57] ABSTRACT

An electronic voice recognition system utilizes a microphone having noise-cancelling characteristics and a standardizer network to achieve further noise reduction and signal standardization over a range of input levels. The output of the standardizer is coupled to voice processor circuitry which provides a computer-compatable output corresponding to the voice information received. The system may be embodied in a multi-station environment in which the voice reception stations are coupled to a remote central processing location. A variety of processing techniques, including analog and digital, parallel and sequential, may be utilized to pass the voice signals to the processors. Upon successful processing, a confirmation signal is passed to the appropriate voice-originating station.

5 Claims, 7 Drawing Sheets

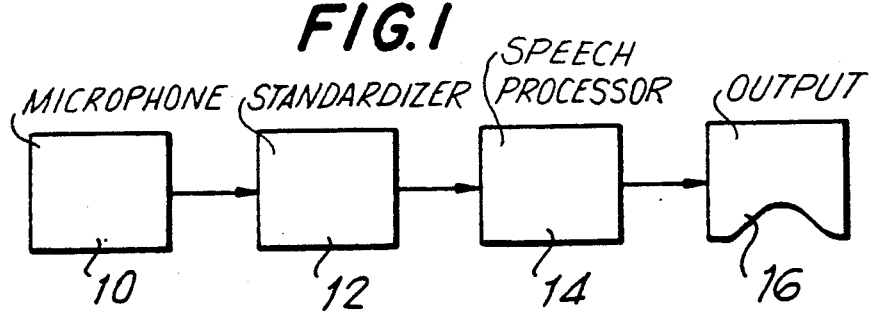
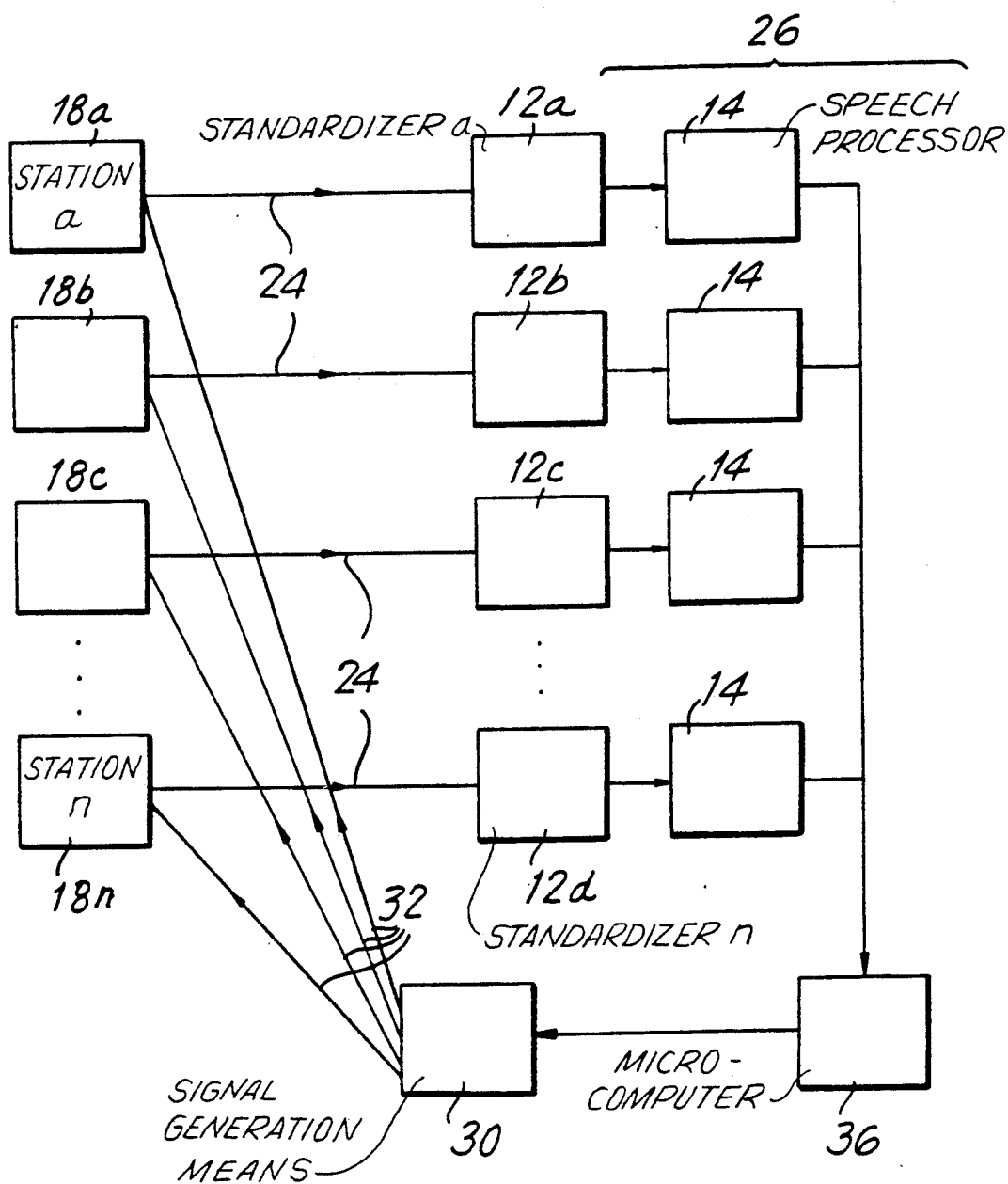

MULTI-STATION VOICE RECOGNITION AND PROCESSING SYSTEM

The present invention relates to a new and improved method and system for the electronic recognition of spoken speech.

BACKGROUND OF THE INVENTION

There has long been a recognized need for electronic systems capable of recognizing speech on a real-time basis with a high degree of accuracy. Much success has been accomplished with such systems, which generally fall into two broad categories. In the first category are speaker-dependent systems, which require that they be "trained" to acquaint them with the voices to be recognized of normally a limited number of speakers. The second category of systems is designed to understand a variety of speakers with varying accents and speech patterns, and without training. In general, systems of the second category, referred to as speaker-independent, have a smaller recognition vocabulary than that available for speaker dependent systems.

Despite major advances, difficulties are still experienced in creating a reliable speech recognition system which can function in both a high and changing noise environment. In particular, there is a need for such systems in environments where background noise, from a variety of sources, may be present and where a real-time analysis and record of speech must be accomplished. Securities transactions, for example, occurring on the trading floor of a stock exchange through orally-issued and executed orders, would be particularly well served by processing and recordation through an electronic speech recognition system. Such a system, capable of discerning the oral buy or sell order of a trader, would provide significant improvements and safeguards over current systems, as it could provide an essentially instantaneous documentation both of the specifics of a trade and the time at which the trade was executed, thus preventing, for example, the manipulation of the claimed time of a trade, resulting in securities fraud and other improprieties.

It is accordingly a purpose of the present invention to provide an integrated electronic voice recognition system capable of high levels of performance in high noise, as well as changing noise, environments.

Another purpose of the present invention is to provide an electronic voice recognition system capable of interconnecting a plurality of voice sources to a centralized processing unit.

Yet another purpose of the present invention is to provide such a voice recognition system which allows for unrestricted movement of the voice sources, and which can provide a confirmation signal to a given voice source upon receipt and successful recognition of the transmitted voice signal.

BRIEF DESCRIPTION OF THE INVENTION

The present invention provides a system and methodology by which high-accuracy electronic speech recognition may be accomplished in high-noise and changing nose environments. In addition, the present invention provides for an integrated system in which such speech recognition is carried out which can incorporate a plurality of voice source locations coupled to a centralized processor and which has the facility to confirm, to each voice source independently, the receipt and recognition of the transmitted speech.

The present invention achieves such results by incorporating specialized microphone, voice-standardization and processor elements. The use of noise-cancelling components, either acoustic, electronic, or a combination thereof, in the microphone and preprocessor elements, coupled with advanced speech recognition algorithms incorporated in the processor element, results in a robust recognition system providing extreme accuracy in noisy environments.

A plurality of microphone inputs may be coupled, either by hard-wiring or by wireless techniques, such as radio-frequency, infrared or ultrasonic transmissions, with a central processor facility. After processing at the central facility, a confirmation signal, which may be an audio tone, is transmitted back to the initiating speaker to confirm receipt and processing of the spoken data. When transmissions are accomplished by radio link, the confirmation signals may be broadcast by a scanning transmitter, which accesses the individual frequencies assigned to the sources on a repetitive, sequential basis, transmitting an appropriate signal on the appropriate frequency for confirmation. Both microphone and speaker elements for each user may be incorporated into a handset or headset as desired.

BRIEF DESCRIPTION OF THE DRAWINGS

A fuller understanding of the present invention, and the objects and features thereof, will become apparent upon consideration of the following detailed description of preferred, but nonetheless illustrative embodiments of the invention when taken in conjunction with the annexed drawings, wherein:

FIG. 1 is a block diagram of the basic system of the present invention;

FIG. 2 is a block diagram depicting a multiple source system capable of generating confirmatory signals;

DETAILED DESCRIPTION OF PREFERRED EMBODIMENTS

Figure 3:
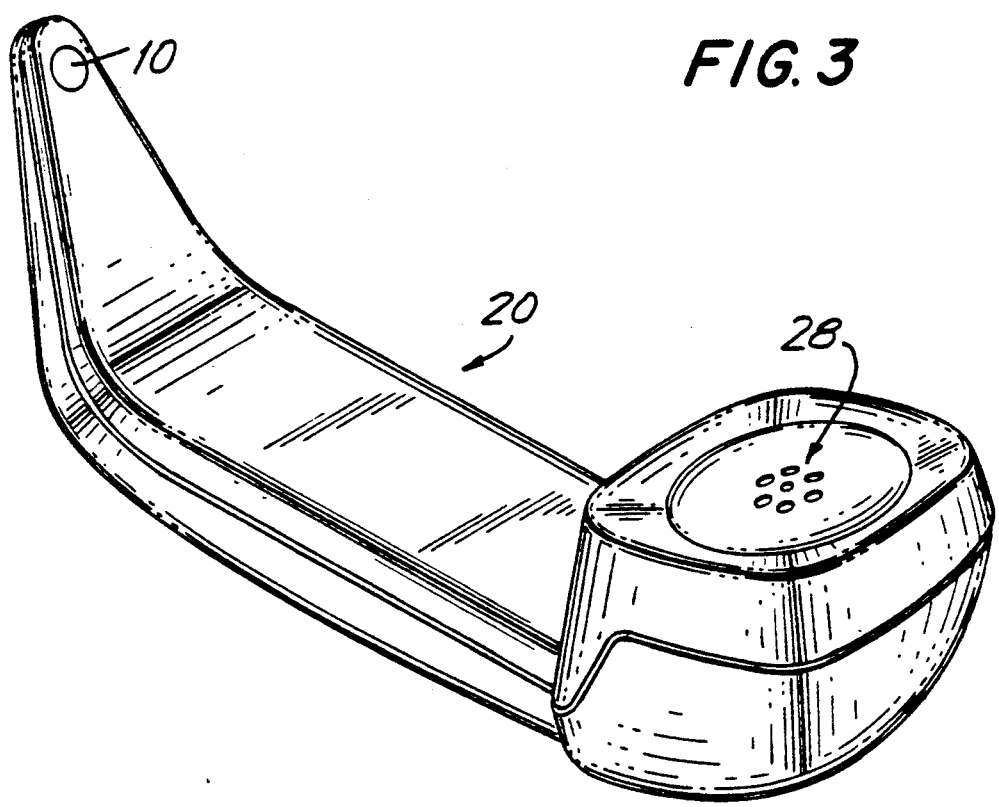
FIG. 3 is a perspective view of a handset which may be utilized in connection with the system of FIG. 2.

As shown initially in FIG. 1, the speech recognition system of the present invention comprises a microphone 10, coupled to a voice-standardizer 12, the output of which is applied to main speech processor 14. The output 16 of processor 14 is normally a digital, computer-compatible representation of the spoken words processed by the system. This output may be stored, further processed and/or displayed as required.

Microphone 10 is a noise-cancelling microphone, preferably having a spatial response characteristic which effectively rejects sounds not emanating at a point close to and directly in front of the microphone.

Such a microphone, positioned directly in front of the mouth of the speaker, provides a first, relatively high level of ambient and unwanted noise rejection. In particular, a Knowles Electronics type BW1789 microphone has been found to have noise cancellation characteristics especially well adapted to use in the present system. Alternatively, an omni-directional microphone, without any noise cancellation capability, coupled to a Cepstrum-type digital filter circuit as known in the art can be utilized with similar results. Such digital filter circuitry may be advantageously employed in environments where it is impractical to talk directly into a closely-positioned microphone, such as in conjunction with automotive cellular telephone systems in which the microphone element is normally located a significant distance away from the user's mouth, for example, on the dashboard.

Voice-standardizer 12, to which the output of the microphone is coupled, is preferably a unit which rejects the portions of the input signal corresponding to noise only, without speech information, and provides a standardized audio equivalent output over a range of voice levels. A preferred standardizer utilized in the present invention where an analog input is utilized is the instantaneous audio compressor of Extrema Systems International Corporation, 10805 Parkridge Boulevard, Reston, Va. 22091.

After the additional noise reduction resulting from standardization, the output of the standardizer is applied to the main speech recognition processor 16. The preferred processor is the Series 5000 processor of Verbex Voice Systems, Inc., 185 Ridgedale Avenue, Cedar Knolls, N.J. 07927. Such a unit is speaker-dependent, and is able to recognize words connected together in a natural speaking manner from an active vocabulary of approximately 600 words. Multiple "templates" can be created by the processor during "training" to accommodate a plurality of speakers.

Figure 4:
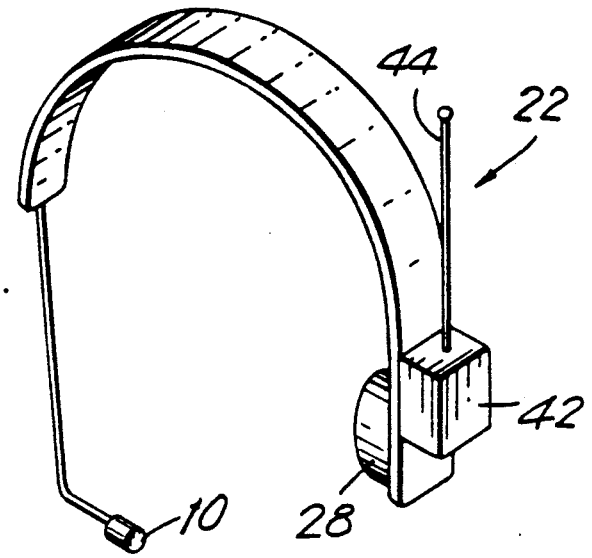
FIG. 4 is a perspective view of a headset which may be utilized in connection with a wireless system.

As shown in FIG. 2, the basic system set forth in FIG. 1 may be applied to an environment in which there exists a plurality of independent voice data-initiating stations each coupled to a central processor location. As shown therein, a series of stations 18a-n, which, for example, may corresond to a plurality of individual traders on the floor of a stock exchange, are each provided with a microphone 10. The microphone 10 may be embodied within a handset, such as handset 20 shown in FIG. 3, or within a headset, such as headset 22 depicted in FIG. 4, which allows for hands-free operation.

Each of the stations 18 is coupled by a transmission means 24 to a central station location 26 at which remaining signal processing is accomplished. In the stock exchange environment, such equipment may be located in an area remote from the trading floor. Each station 18 is assigned a standardizer 12, and a speech processor 14 which may be incorporated within microcomputer 36, or may be in the form of a stand-alone unit. The microcomputer 36 may typically allow the further processing of the information, such as appending the identification of the trader, assigning a trade number, the time and date to the data, providing paper, disc or tape copies, and executing and electronic transfer of the security. Depending on the specific environment, one or more microcomputers 36 may be needed to support the speech processors. In a stock exchange environment, for example, it is contemplated that each processor 14 will have a dedicated microcomputer 36.

With the successful processing of the audio data, microcomputer 36 directs signal generation means 30 to issue a confirmation signal to the appropriate source station 18 via transmission means 32. Preferably, such confirmation may be a tone signal sent to the speaker or earphone portion 28 of the handset 20 or headset 22 being worn by the individual initiating the data processed. Signal generation means 30 includes appropriate gate circuitry as known in the art to pass the signal only along the proper transmission means.

The system depicted in FIG. 2 may be embodied in both wired and wireless transmission systems. In a hardwired version, both transmission means 24 and 32 may comprise cables linking the microphones 10 and earphone 28 of the headsets 22 or handsets 20 with the central station 26. With appropriate known coupling and isolation circuitry, both transmission means may be incorporated in a single cable pair.

Figure 5:
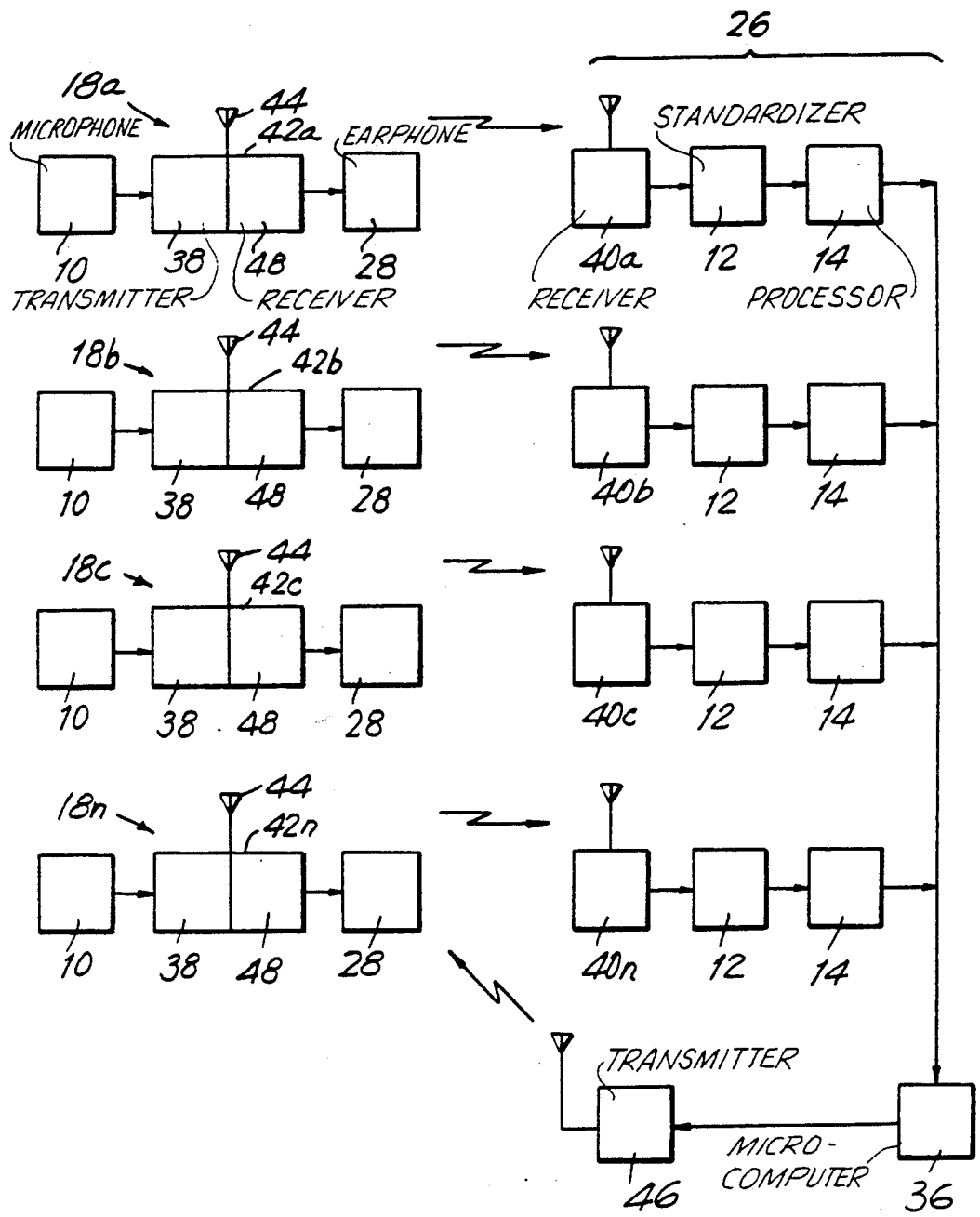
FIG. 5 is a block diagram of a wireless embodiment of the generalized system of FIG. 2.

Alternatively, the system of FIG. 2 may utilize an ultrasonic, infrared, radio or other wireless link for the transmission means 24 and 32. Such a radio-frequency system may advantageously utilize frequency modulated signals, each station 18 including a transmitter 38 operating on a distinct, pre-assigned frequency, as depicted in FIG. 5. In such a system, a plurality of receiver units 40, each one assigned one of the frequencies, are utilized in front of the standardizers 12 and processors 14 to receive the transmissions from the stations 18. In such a system, the headset of FIG. 4 may be advantageously used to provide hands-free operation, each headset being provided with a combination transmitter/receiver unit 42 having antenna 44.

In this embodiment, processing confirmation may be accomplished by the signal generation means 30 and transmission means 32 of FIG. 2 being incorporated into radio transmitter means 46, which may comprise either a plurality of independent transmitters, each tuned to a specific frequency assigned to a station 18 or, preferably, a single scanning transmitter in which the transmitting frequencies are synthesized and scanned in a repetitive fashion. Upon receipt of an appropriate signal from microcomputer 36, a tone transmission is emitted on the appropriate frequency, such transmission being received by the appropriately tuned receiver section 48 of the transceiver 42 of the originating station. The confirmation tone is passed to the user by the earphone 28.

To provide totally hands-free operation, the transceiver 42 may include vox (voice operated transmission) whereby the transmitter portion 38 is enabled automatically upon receipt by the microphone 10 of a voice signal. In addition, the transceiver may include a coded squelch which precedes all transmissions with a station-specific code, which the receiver 40 requires to receive and pass the subsequent portion of the transmission. This prevents receipt of a spurious or unauthorized transmission, and can serve as an additional means of identifying the transmission for later processing and for associating the acknowledgement signal sent by transmitter 46 with the correct initiating station.

The transmitters 38, as well as receivers 40, may also include integral frequency-hopping means, by which both a transmitter and the associated receiver are tuned among a specific set of individualized frequencies on a continuous basis. This provides increased privacy of the transmissions, as any evesdropping receiver would be required to similarly scan the transmission frequencies in step with the intercepted transmission. Alternatively, other privacy-insuring steps, such as scrambling of the audio signal by transmitters 38 and unscrambling by receivers 40, as known in the art, can be used to minimize the risk of unauthorized reception.

Figure 6:
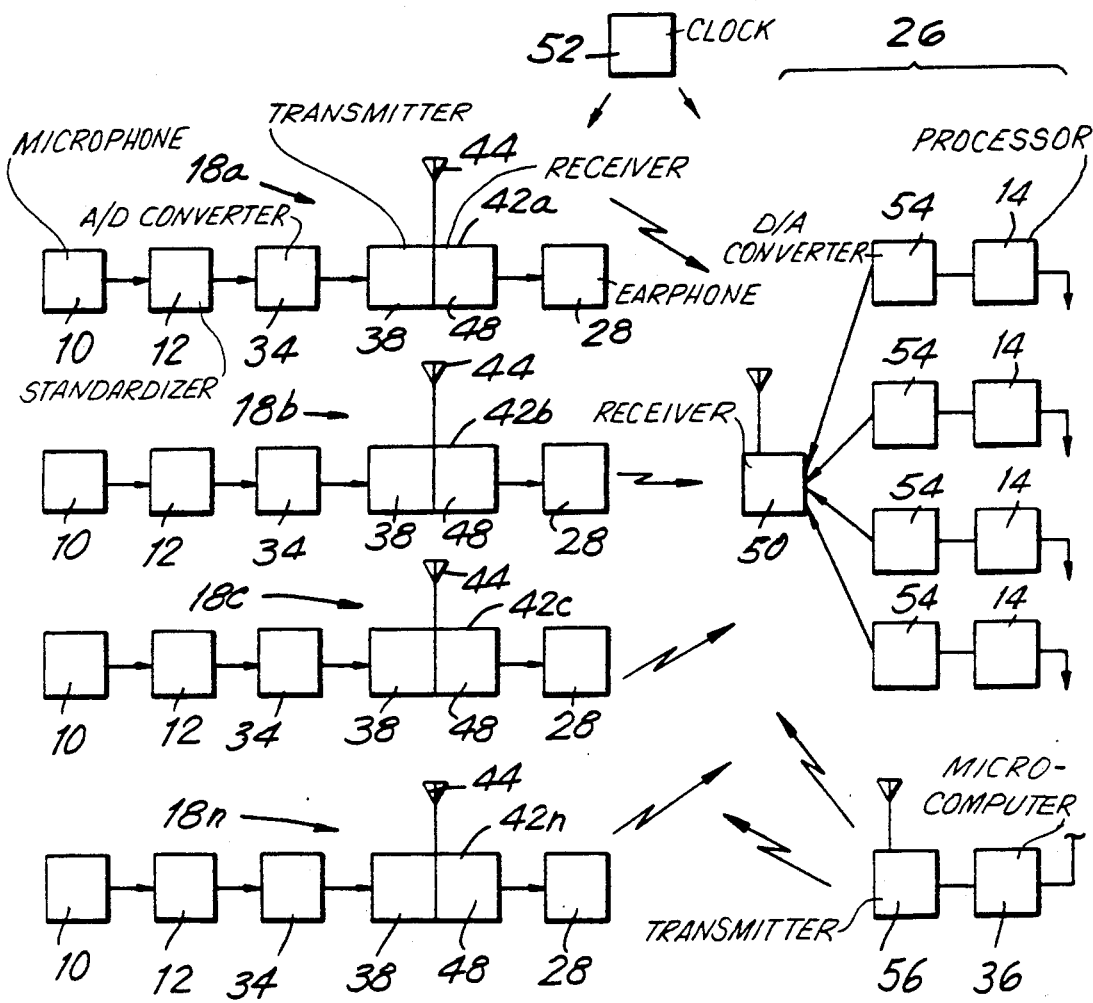
FIG. 6 is a block diagram of an embodiment of the system utilizing the time-division multiplexing.

The present invention may alternatively utilize digital sampling techniques to minimize the number of transmitters and receivers necessary. In particular, and as depicted in FIG. 6, each station 18 includes microphone 10 coupled to a standardizer 12. The analog output of the standardizer is sampled on a repetitive basis by analog to digital converter 34, which provides a periodic digital output which corresponds to the instantaneous value of the converted analog signal. Using known control theory parameters, a sampling rate of approximately 15 Khz is sufficient to allow complete and accurate reconstruction of the sampled analog signal.

Using techniques known in the art, a fixed transmission sequence among all the active stations 18 is created, each station being assigned a given time slot in the sequence. So long as the sequence repeats at the 15 Khz level, the position in the sequence of a given station is irrelevant for reconversion accuracy.

Each station's transmitter 38 is activated in sequence, each transmitter broadcasting the instantaneous digital data to single receiver 50. As both the transmitters 38 and receiver 50 are in synchronism as controlled by timing pulses provided by master clock 52, reception of each station's broadcast can be identified by its position in the sequence with respect to the timing pulses.

The received digital data are reconverted to their respective analog signals by digital-to-analog converters 54, each of which is similarly synchronized by clock 52 to respond only to data from a given station. The recreated data is then passed to the appropriate dedicated processor 14.

Confirmation transmitter 56 may similarly be tied to clock 52, so as to transmit a confirmation signal to a given station 18 during a time slot which station receiver 48 is activated, such activation again being in a prearranged sequence with reference to the timing pulses of clock 52.

It is to be recognized that, where processors 14 accept digital, rather than analog, signals as input, digital-to-analog converters 54 need not be utilized. Rather, a switching means would direct the digital data to the appropriate processor.

Figure 7:
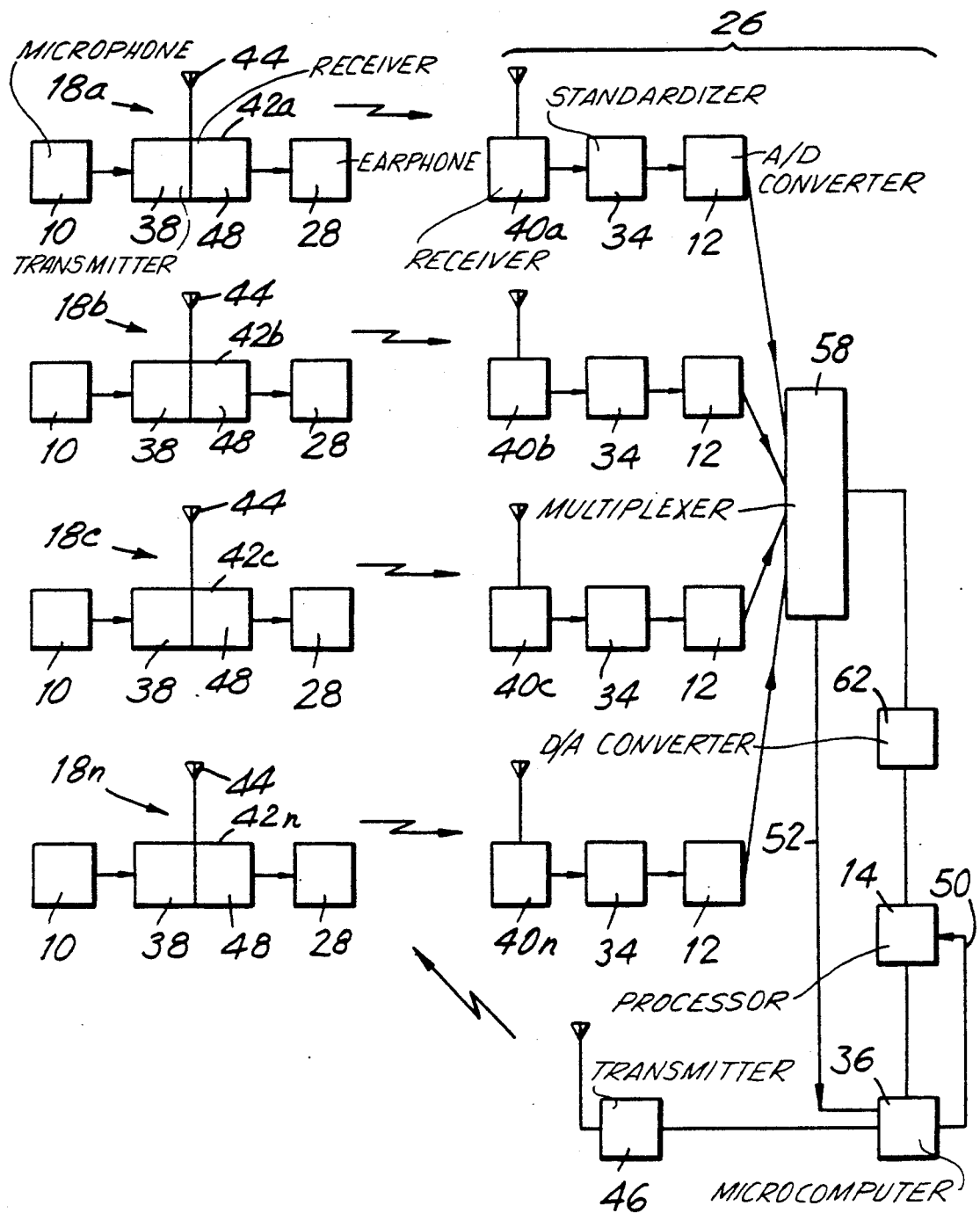
FIG. 7 is a block diagram of another wireless embodiment of the system, utilizing multiplexing at the receiver end.

Depending on the application, it may be possible to utilize other multiplexing techniques to allow sequential, rather than parallel, processing of the signals from the various stations. Such sequential processing can be used when real-time recognition is not essential, and time delays in processing are acceptable. This would allow additional economies to be recognized. As applied to the system of FIG. 5, such an embodiment is illustrated in FIG. 7. As depicted therein, the outputs of the standardizers 12 are sampled, converted to digital form, by analog to digital converter 34, and forwarded by multiplexing means 58. Multiplexer 58 further has the capability of storing received data to allow a complete transmission to be assembled. Upon conversion of an entire transmission the multiplexer passes the data to the single recognition processor 14. The multiplexer, using methodology known in the art, prevents signals arriving together from being combined and processed together. The standardizers 12, while shown at the central station, can alternatively be placed at the stations 18.

The output of speech processor 14 is handled as required by a single microcomputer 36. In addition to its other functions, microcomputer 36 maintains an electronic inventory of templates for intended users of the system, the correct one of which being loaded into the processor 14 as required, as shown by the path 50. A user "signs on" onto the system by being assigned a station identifier, which corresponds to an identifier assigned by the multiplexer 58 to the output of the appropriate receiver 40. Microcomputer 36 downloads the templates for the signed-on individuals, making them available for the processor 14 as called for by the receipt of the multiplexer identifier over line 52 as the digitized voice signal is outputted by the multipexer. Digital-to-analog converter 62 may be employed when processor 14 requires an analog input, or may be eliminated when a digital input is allowed. After processing is completed, transmitter 46 broadcasts the appropriate confirmation signal.

Figure 8:
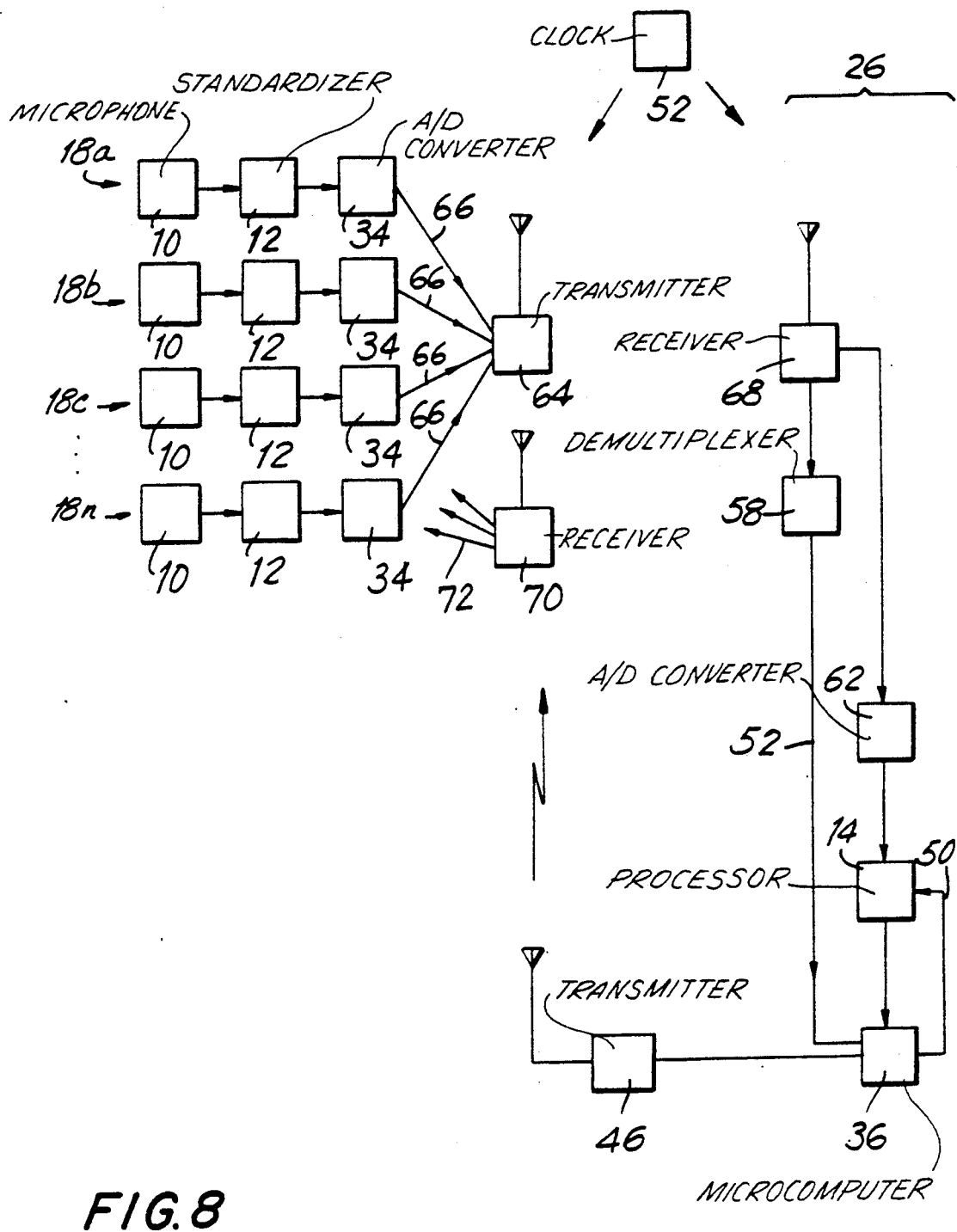
FIG. 8 is a block diagram of a wireless system using switching means with multiple transmitters.

A further modified version of the wireless system of FIG. 7, which includes features of the system of FIG. 6, can further reduce the number of station transmitters and receivers coupled to the central station 26, is shown in FIG. 8. As depicted therein, the outputs of the standardizers 12 located at the stations 18 are each sampled in sequence and digitized by the converters 34 as controlled by clock 52 and are coupled to a common transmitter 64 by secondary transmission means links 66, which may be wired or wireless. As the signals are passed to the transmitter in sequence, there is no overlap. At the remote central station 26 receiver 68 receives the transmissions, with demultiplexer means 58 storing and converting the received signal into the individual initiating transmissions, and identifying the initiating station to microcomputer 36 on line 52 so that the appropriate template can be loaded on line 50 into the speech processor 14 by the microcomputer. The signals, converted to analog, if required, are passed to the processor in sequence.

To produce confirmation signals, the central station transmitter 46 broadcasts on a fixed frequency, and is synchronized by clock 52 to time its transmissions to allow receiver means 70, similarly synchronized, to route the confirmation signal to the earphone of the appropriate station 18 along secondary transmission link 72.

While the secondary transmission links 66 and 72 are preferably wired, they also may be of the wireless variety and may, for example, incorporate infrared transmissions so as to not interfere with the radio-frequency transmissions of transmitters 46 and 64.

Figure 9:
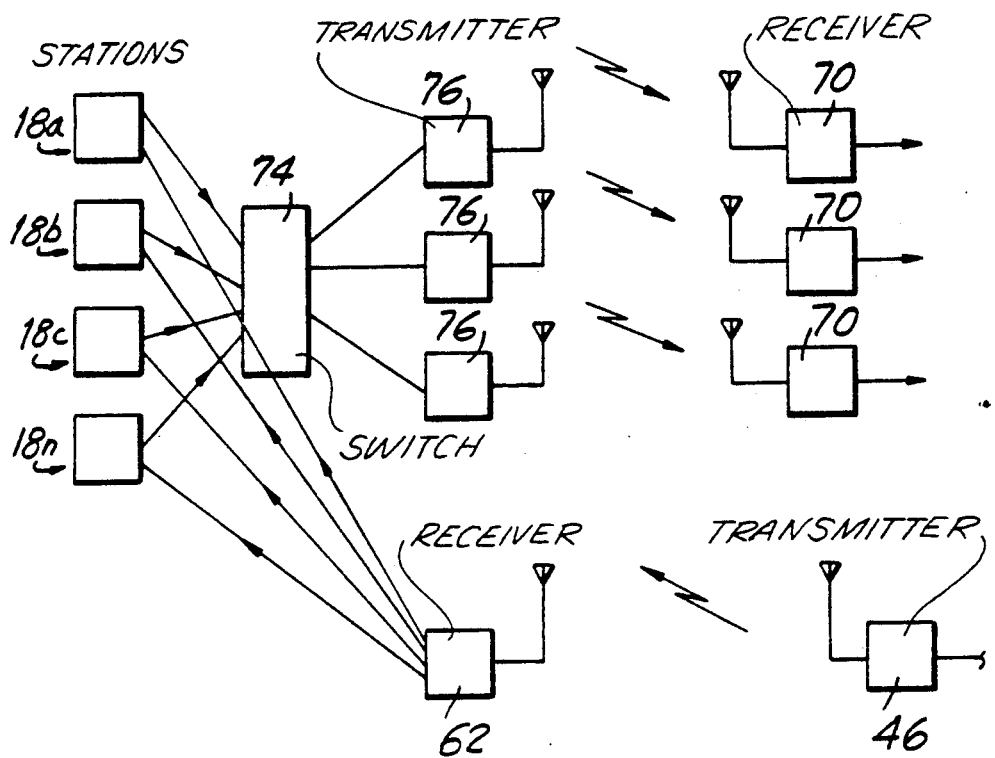

In yet another embodiment, the station 18 outputs may be multiplexed together for transmission over a plurality of transmitting frequencies, when the transmitters are fewer in number than the stations to which they are joined. As depicted in FIG. 9, the standardized audio outputs of the stations 18 may be controlled by switching means 74, which passes the received signals to one of a plurality of transmitters 76. In this embodiment, the individual signals are not combined into a single transmission, but rather are individually directed to an available transmitter. Thus, the directed signals can be either analog or digital. When transmitter capacity is reached, the additional signals are ignored.

Within a given environment, it can be determined, on a statistical basis, the optimum number of channels needed to insure a certain level of availability of access to a transmitter. For example, in a stock exchange environment, not every trader on the floor will be engaged in a transaction simultaneously. Depending on the acceptable delay, statistical or empirical analysis of the operation of the floor trading will provide an indication of the number of channels needed to insure, for example, that 95% of the trades can be transmitted on an instantaneous basis, with the remaining 5% having access to a channel within, say, 10 seconds.

Switching means 74 accepts the audio signals on a first-in, first-out basis, and assigns a transmitter 76 as available on a real-time basis for the duration of the transmission. Receivers 70, each tuned to the frequency of a transmitter 68, receive the audio transmissions and pass them for further processing.

To allow such processing, an identifier must be appended to the start of each transmission to identify the source from which it originates. This identifier, which can be added by switching means 74, allows the downloading of templates to the processors 14 or, alternatively, routing of the received transmission to the approximate dedicated processor.

Because confirmation signal transmitter 46 passes a tone upon successful processing to the appropriate station 18, a user who does not receive a tone within, say, 5 seconds of completing a voice entry would be alerted that his signal was not transmitted and would thus revocalize. With a proper choice of the number of transmitters, system throughput can be maintained at a high level with a significant decrease in the number of transmitters needed from a fully dedicated transmission scheme. In a digital embodiment, switcher 66 can further include a storage capability to allow it to maintain, rather than ignore, inputs when all transmission channels are occupied. Depending on the extent of memory utilized, it may be possible to eliminate the necessity of revocalization completely.

Figure 10:
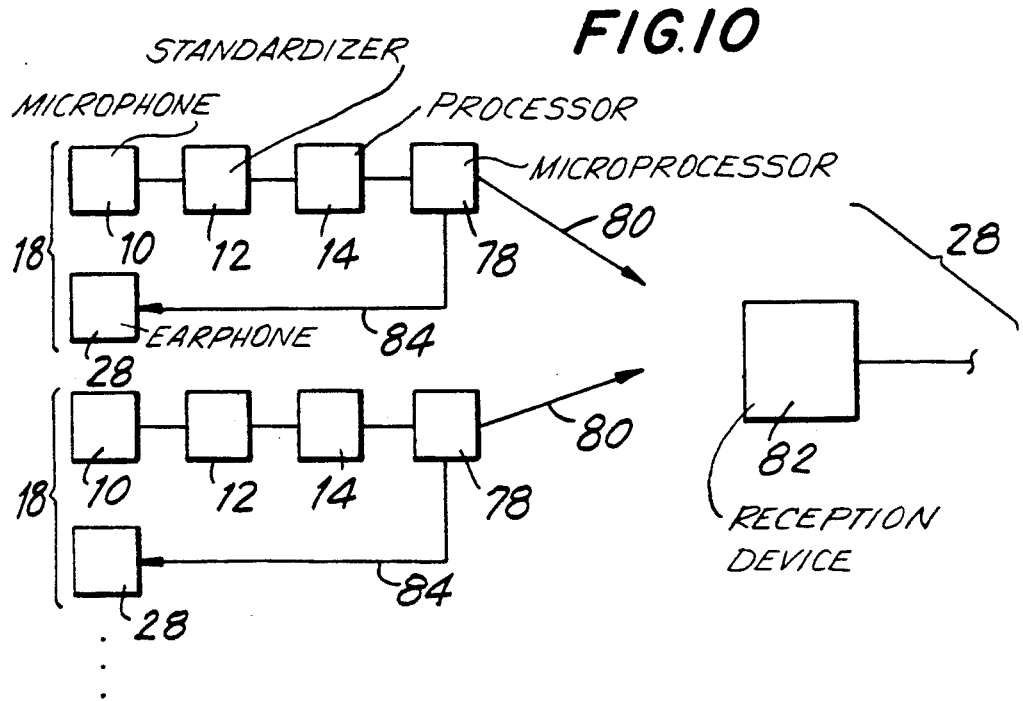
FIG. 10 is a block diagram of a multiple source system utilizing individual processors at the station sites.

Each of the foregoing embodiments contemplates the use of speech processors 14 at the central station location 26. Alternatively, it is contemplated that, with the increase of computing power embodied in ever-shrinking processor packaging, each station 18 may include a complete processing system, including a microprocessor 78 as depicted in FIG. 10. The output of the processor 78, being digital, may be transmitted by transmission means 80 to an appropriate reception device 82 at the central station 26. Such reception device may be, for example, a large main-frame computer capable of processing the data received from a large number of stations 18 in an efficient manner. As the band-width needed to transmit the voice recognizer's digital data is significantly smaller than that needed for analog data, any of a variety of transmission techniques and multiplexing systems known in the art may be employed in an efficient manner. In addition, since all processing is done at the station 18, the confirmation signal to earphone 28 need not be transmitted from the central station, but may be passed over local line 84, thus further reducing system cost and complexity.

We claim:

1. An electronic voice recognition system comprising a plurality of input stations coupled to a remotely positioned central processor, each of said input stations including microphone input means for generating an electrical signal corresponding to an audio input comprising voice and non-voice components, said microphone input means having means for attenuating said non-voice components such that said electrical signal is primarily voice-representative; processor means coupled to said input means for generating a digital computer-compatible output signal representing said voice component, said processor comprising a template whereby said electrical signal is compared to stored data to generate a pre-determined output signal upon correspondence therebetween; wireless transmission means for transmitting said digital output signal to a central facility; data processing means at said central facility for the reception and storage of said output signal for the implementation of computer routines upon receipt of said output signal; and confirmation-generating means operatively coupled to said data processing means for generating a confirmation signal upon successful receipt of a transmission by said data processing means from one of said stations, said confirmation generating means including second wireless transmission means for directing said confirmation signal only to the one of said input stations from which said recognized signal emanated.

2. The system of claim 1, wherein each of said input stations is assigned a unique transmission time interval in an overall transmission interval such that the receipt of an output signal by said data processing means may be associated with the input station from whence it was transmitted.

3. The system of claim 2, wherein said wireless transmission means is voice actuated.

4. The system of claim 2, wherein said microphone input means includes a pressure-to-electrical-transducer coupled to an electronic filter.

5. The system of claim 1, wherein each of said second wireless transmitter means is a scanning transmitter having a sequential output upon a plurality of frequencies, each of which frequencies being associated with a separate of said input stations, said confirmation signal being transmitted upon the frequency associated with the one of said input stations from whence the corresponding digital output signal emanated.

* * * * *